United States Patent
Korogi et al.

(10) Patent No.: US 8,918,681 B2
(45) Date of Patent: Dec. 23, 2014

(54) TEST MODULE GENERATION APPARATUS, TEST PROCEDURE GENERATION APPARATUS, GENERATION METHOD, PROGRAM, AND TEST APPARATUS

(71) Applicant: Advantest Corporation, Tokyo (JP)

(72) Inventors: Hiroya Korogi, Gunma (JP); Kuniaki Isohata, Saitama (JP); Naohiro Fujikake, Gunma (JP); Takuya Toyoda, Saitama (JP)

(73) Assignee: Advantest Corporation, Tokyo (JP)

( * ) Notice: Subject to any disclaimer, the term of this patent is extended or adjusted under 35 U.S.C. 154(b) by 201 days.

(21) Appl. No.: 13/655,467

(22) Filed: Oct. 19, 2012

(65) Prior Publication Data

US 2013/0139004 A1 May 30, 2013

(30) Foreign Application Priority Data

Nov. 28, 2011 (JP) ................. 2011-258903

(51) Int. Cl.
*G06F 11/00* (2006.01)
*G06F 11/263* (2006.01)

(52) U.S. Cl.
CPC ................... *G06F 11/263* (2013.01)
USPC ........................................................ 714/46

(58) Field of Classification Search
CPC ............ G06F 11/3672; G06F 11/2294; G06F 11/263; G06F 11/3684; G06F 11/22; G06F 11/0748
USPC ...................................... 714/32, 46
See application file for complete search history.

(56) References Cited

U.S. PATENT DOCUMENTS

2009/0199160 A1* 8/2009 Vaitheeswaran et al. ...... 717/124
2010/0218168 A1* 8/2010 Gonzales, II .................. 717/124

FOREIGN PATENT DOCUMENTS

| JP | 9-62530 A | 3/1997 |
|---|---|---|
| JP | 2001-156176 A | 6/2001 |
| JP | 2001-243086 A | 9/2001 |
| JP | 2006-323706 A | 11/2006 |

OTHER PUBLICATIONS

Office Action for Japanese Patent Application No. 2011-258903, issued by the Japanese Patent Office on Sep. 17, 2013.

* cited by examiner

*Primary Examiner* — Yair Leibovich

(57) ABSTRACT

Provided is a test module generation apparatus that generates a test module executed on a test apparatus for testing a device under test. The apparatus includes a condition file generating section in which a test condition is input and that generates a condition file specifying the input test condition, a test method storing section that stores a test method, a test method selecting section that receives, from a user, a selection instruction of the test method adapted to the test module to be generated, a condition file selecting section that receives, from a user, a selection instruction of the condition file corresponding to a parameter which the selected test method requires, and a test module generating section that generates the test module in which a test according to the selected test method is executed with a parameter specified by the condition file.

16 Claims, 7 Drawing Sheets

TEST MODULE GENERATION APPARATUS, TEST PROCEDURE GENERATION APPARATUS, GENERATION METHOD, PROGRAM, AND TEST APPARATUS

BACKGROUND

1. Technical Field

The present invention relates to a test module generation apparatus, a test procedure generation apparatus, a generation method, a program, and a test apparatus.

2. Related Art

When a device under test is tested by a conventional test apparatus, a user creates a program adapted to the test by using a programming language provided for the test apparatus. A user debugs the created test program and then actually applied it to the test (for example, see Patent Document 1). The above-mentioned Patent Document 1 is Japanese Patent Application Publication 2006-323706.

However, to create such test program, a user is required to have expertise in hardware specifications and the programming language of the test apparatus, and to have programming experience, and thus the test program cannot be easily created.

SUMMARY

Therefore, it is an object of an aspect of the innovations herein to provide a test module generation apparatus, a test procedure generation apparatus, a generation method, a program, and a test apparatus, which are capable of overcoming the above drawbacks accompanying the related art. The above and other objects can be achieved by combinations described in the claims. A first aspect of the innovations may include a test module generation apparatus that generates a test module executed on a test apparatus for testing a device under test. The apparatus includes a condition file generating section in which a test condition is input and that generates a condition file defining the input test condition, a test method storing section that stores a test method, a test method selecting section that receives, from a user, a selection instruction of the test method adapted to the test module to be generated, a condition file selecting section that receives, from a user, a selection instruction of the condition file corresponding to a parameter which the selected test method requires, and a test module generating section that generates the test module in which a test according to the selected test method is executed with a parameter specified by the condition file.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
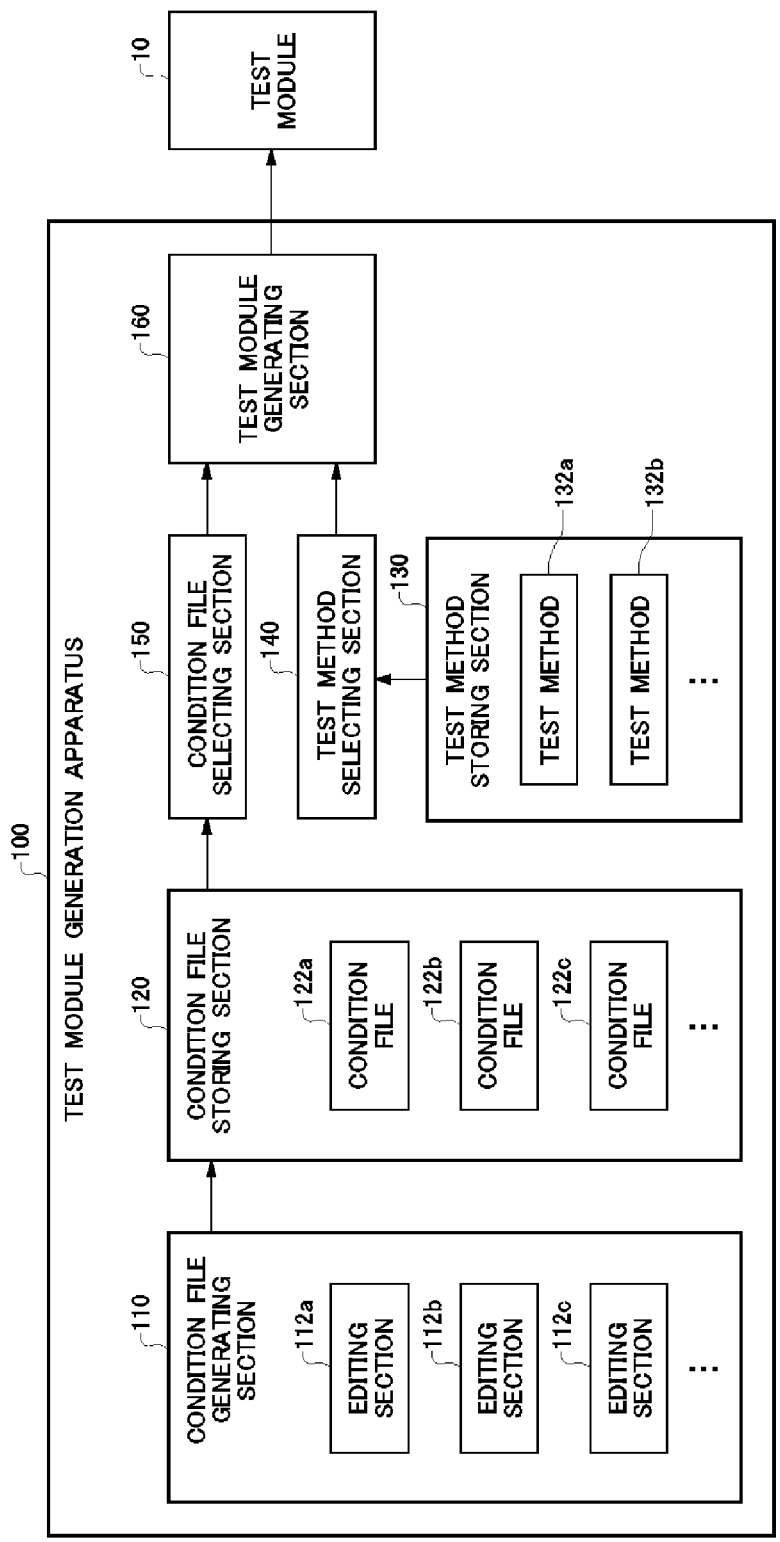
FIG. 1 shows a configuration example of a test module generation apparatus 100 according to an embodiment of the present invention together with a test module 10.

FIG. 1 shows a configuration example of a test module generation apparatus 100 according to an embodiment. The test module generation apparatus 100 generates a test module 10 which is executed on a test apparatus for testing a device under test.

The test module generation apparatus 100 generates various test modules 10 by combining, a test method 132 and various test conditions. The test method 132 is a stylized algorithm, which is, for example, a condition setting for a device under test, or a measuring method. The test module generation apparatus 100 includes a condition file generating section 110, a condition file storing section 120, a test method storing section 130, a test method selecting section 140, a condition file selecting section 150, and a test module generating section 160.

Test condition is input in the condition file generating section 110, and the condition file generating section 110 generates a condition file 122 that defines the input test conditions. Here, the test condition can be, for example, a setting value used to execute a test, such as a supply voltage value, a pin to be measured, a voltage measuring range and a through rate. The condition file generating section 110 uses an editing section 112 to enable a user to input test conditions for generating the condition file 122.

The editing section 112 is a graphical user interface (GUI) tool that generates the condition file 122 according to a test condition input by a user. For example, the editing section 112 displays a setting item such as "a supply voltage value," "a voltage measuring range," and "a through rate" together with unit used for the setting term. The editing section 112 also displays an input control or an input component for a user to input a value to set the test condition.

The editing section 112 may enable a user to input the test condition by using a GUI such as a radio button, a check box, a slider, a spin button, a list box, a drop-down list, and a text box. The editing section 112 may further retrieve the condition file 122 which has been created in advance, in response to a designation by the user, and it may edit the test condition depending on user's input.

More than one editing section 112 is provided in the condition file generating section 110 depending on the generated condition file 122. For example, an editing section 112a operates as a power-supply condition editing section that generates a condition file 122a in which a power supply condition such as values of a voltage and current supplied to a device under test, and limit values thereof are written. For example, an editing section 112b operates as a pin condition editing section that generates a condition file 122b in which pin conditions such as signal pin connections of a device under test are written. For example, an editing section 112c operates as a power source sequence condition editing section that generates a condition file 122c in which power sequence conditions such as a sequence of a signal voltage supplied to a device under test and the so on are written.

The editing section 112 may generate more than one condition file 122 depending on a test to be performed. For example, the editing section 112a that operates as the power-supply condition editing section generate condition files 122a, 122d, 122e and so on in which power supply conditions are written.

The condition file storing section 120 stores the condition file 122 that is generated by the editing section 112. The condition file storing section 120 may be a memory device that stores data, or may be an external storage device or the like.

The test method storing section 130 stores the test method 132. The test method storing section 130 may store more than one test method 132 that is generated in advance. The test method storing section 130 may be a memory device that stores data, or may be an external storage device or the like.

The test method 132 designates the order in which basic test programs are invoked. The test method 132 includes a definition section describing definitions of test conditions, a conversion section describing associations between the test conditions defined by the definition section and hardware modules in which the test conditions are set, and an execution processing section that describes a sequence of the test according to the test method 132.

The test method 132 describes the association between condition settings of the condition files 122 and condition settings of the hardware modules. In this way, the test method 132 can covert the test conditions which a user wishes to apply to a test and which are written in the condition files 122 into settings of the hardware modules of the test apparatus.

The test method 132 describes a sequence of a test, which is the order in which basic test programs are invoked, as well as associations between the condition setting of the condition file 122 and the condition setting of the hardware modules. In this way, a user is able to combine the condition file 122 and the test method 132, and consequently a sequence described in the execution processing section of the test method 132 is executed with the test conditions which the user has input.

In other words, a user can input test conditions without being aware of the correspondences between the test conditions and the condition settings of the hardware modules. The test method 132 sequentially invokes basic test programs to describe a sequence for setting conditions of a device under test or a sequence for executing a measuring method of the device under test and so on.

For example, the test method 132a opens all the signal pins of a device under test, and describes a sequence for executing a voltage measuring process to measure a voltage in accordance with the power supply condition specified in the condition file 122a, and a process to determine pass of a test when the measurement result falls within a limit range set in the condition file 122a and determine fail of the test when the measurement result is out of the limit range.

Additionally or alternatively, the test method 132b describes a sequence for executing a process to apply a supply voltage designated in the condition file 122d to a device under test, a process to apply, to the signal pins specified by the pin condition described in the condition file 122b, a signal voltage according to the power supply sequence condition set in the condition file 122c, a process to measure a current running through a power supply pin according to the power supply condition specified in the condition file 122d, and a process to determine pass/fail of the measured results based on the limit values designated in the condition file 122d. In this way, in the test method 132, setting values for test conditions are not described but a stylized test sequence is described.

The test method selecting section 140 receives, from a user, a selection instruction of the test method 132 which is adapted to the test module 10 to be generated. The test method selecting section 140 enables lists of file names or labels of more than one test method 132 stored in the test method storing section 130 to be displayed, and a user may select the test method 132.

The condition file selecting section 150 receives, from a user, a selection instruction of the condition file 122 corresponding to a parameter which the selected test method 132 requires. Here, the condition file selecting section 150 shows lists of file names or labels of more than one condition file 122 corresponding to the test method 132, and a user may select any of the shown condition files 122. For example, when the test method 132a uses a power supply condition as the condition file 122, the condition file selecting section 150 displays a list of the condition files 122a, 122d, 122e and the like in which a power source condition is described, and a user selects the file and an instruction concerning the user selection is supplied to the selecting section.

Additionally or alternatively, when the test method 132b uses a power supply condition, a pin condition, and a power supply sequence condition as the condition files 122, the condition file selecting section 150 displays a list of the condition files 122 in which the above mentioned conditions are described, such that the files are grouped in the types of the test conditions. In this case, a user may select the condition file 122a for the test method 132a and select the condition files 122b, 122c, and 122d for the test method 132b, and the user may signal the selection.

The test module generating section 160 generates the test module 10 that executes a test in accordance with the selected test method 132 with a parameter defined in the selected condition file 122. For example, the test module generating section 160 generates the test module 10 that executes the test method 132a with the condition file 122a, and then executes the test method 132b with the condition files 122b, 122c, and 122d.

Figure 2:
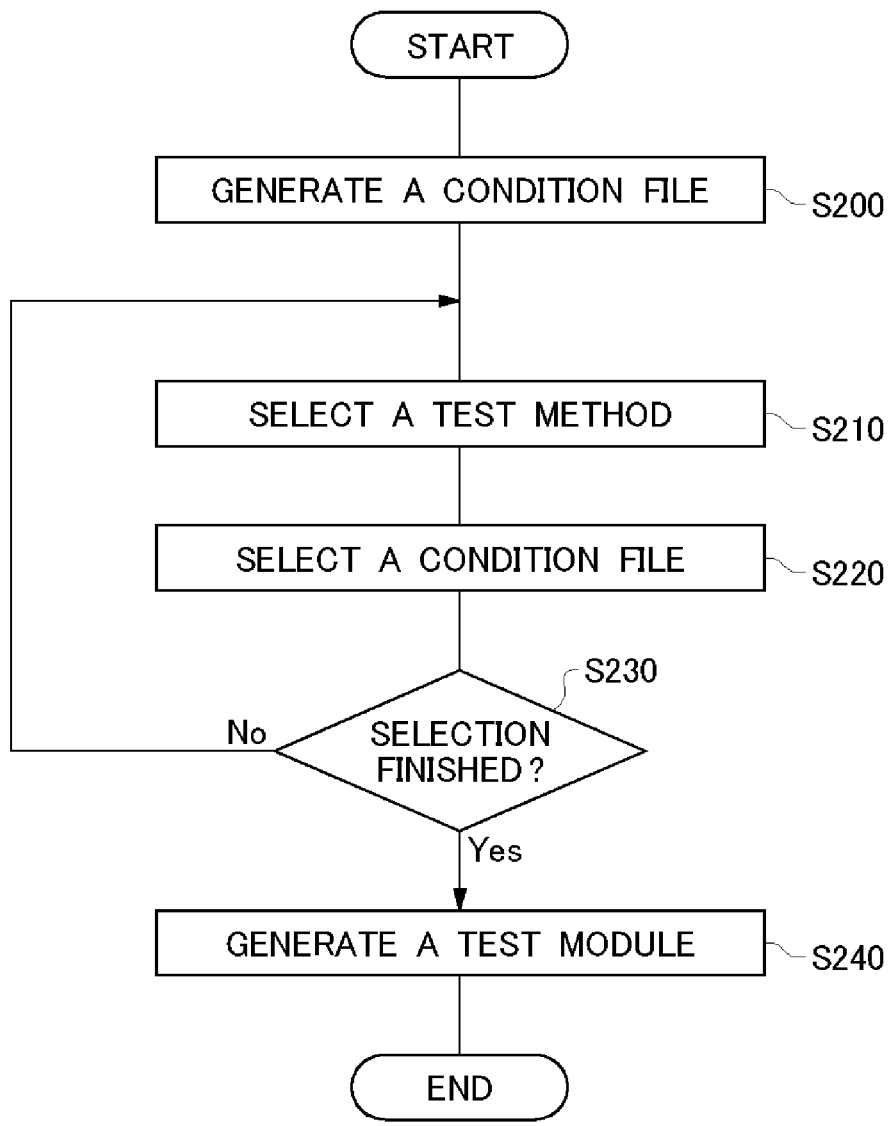
FIG. 2 illustrates an operation flow of the test module generation apparatus 100 according to the embodiment.

FIG. 2 illustrates an operation flow of the test module generation apparatus 100 according to the embodiment. The condition file generating section 110 prompts a user to input a test condition for a test to be executed to generate a condition file in which the test condition is described (S200). Here, the user input the test condition through a GUI of the editing section 112 which corresponds to the condition file.

Subsequently, the test module generating section enables a user to select, through the test method selecting section 140, the test method 132 corresponding to the test to be executed (S210). Here, when parameter input is required for the test method 132 selected by the user, the test module generating section 160 prompts the user to input such parameter in the test method 132.

In this way, the test module generating section 160 enables the user to input a parameter that is not described in the condition file 122, such as pins of the device under test to be measured. In this case, the test module generation apparatus 100 does not generate the condition file 122 for each of the pins to be measured, but can effectively generate the test module 10 that executes substantially the same test for the different pins of the device under test.

When a "specifics" button on a screen to input parameters is pressed, the test module generating section 160 displays a setting screen for setting other parameters for corresponding hardware modules. In this way, when a user wishes to set a specific parameter, the test module generating section 160 displays screens for setting a specific parameter when the user presses the specifics button. Thus, the test module generating section 160 can generate the test module 10 generally without presenting other specific parameters to a user. In this case, the test module generating section 160 may set the other specific parameters to preset values.

The test module generating section 160 prompts a user to select the condition file 122 in accordance with the test method 132 selected by the user through the condition file selecting section 150 (S220). In other words, when file input is required for the test method 132 selected by the user, the test module generating section 160 prompts the user to specify the condition file 122.

The test module generating section 160 repeats Step S210 to Step S220 until the user has selected all the test methods 132 included in the test module 10 to be generated (S230). The test module generating section 160 generates the test module 10 (S240) after the user selects the test method 132 and specifies the condition file 122 corresponding to the selected test method 132.

As described above, a user selects the test method 132 adapted to the test which the user wishes to execute, the user then generates the condition file 122 in which the test condition for the test method 132 is describes, and the condition file 122 is associated with the selected test method 132. In this manner, it is possible to generate the test module 10 that causes a test apparatus to execute the test described in the selected test method 132 can be executed. Consequently, a user can generate the test module 10 without being aware of the hardware specification of the test apparatus, a programming language for the test apparatus, or the like.

The test module generation apparatus 100 can generate the test module 10 for executing, for example, a contact test in which electric connections of a device under test are tested, a power supply current test in which a supply current in a standby mode is tested, a power supply current test in which a supply current at in an operation mode is tested, an input current test, an output current test, a function test, a timing parameter test, and so on. The test module generation apparatus 100 may generate the test module 10 for executing a special test. In this case, the test module generation apparatus 100 may generate a special test method 132 in response to user's input.

More specifically, a user can generate the test method 132 by describing a sequence of the test, which is the order in which basic test programs are invoked, as well as describing associations between the condition setting of the condition file 122 and the condition setting of the hardware modules. In this way, the test module generation apparatus 100 can generate the test module 10 that enables generation of the test method 132 for a user who is capable of programming a test program, and that enables execution of a special test.

Figure 3:
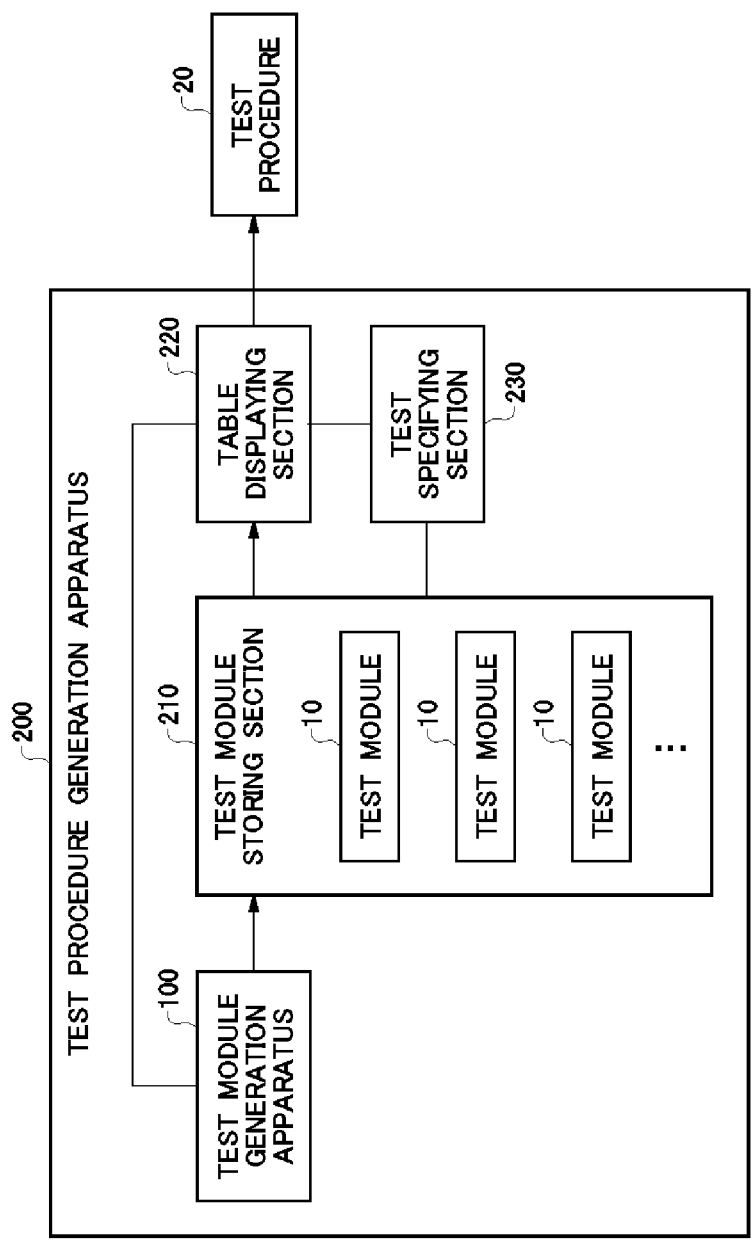
FIG. 3 shows a configuration example of a test procedure generation apparatus 200 according to the embodiment together with a test procedure 20.

FIG. 3 shows a configuration example of a test procedure generation apparatus 200 according to the embodiment. The test procedure generation apparatus 200 generates a test procedure 20 for a device under test. Here, the test procedure 20 manages more than one test module 10 as a single test flow. The test procedure generation apparatus 200 includes the test module generation apparatus 100 described above with reference to FIGS. 1 and 2, a test module storing section 210, a table displaying section 220, and a test designating section 230.

The test module storing section 210 stores the test module 10 generated by the test module generation apparatus 100. The test module storing section 210 may store a plurality of the test modules 10 which are generated in advance. The test module storing section 210 may be a memory device that stores data, or may be an external storage device or the like.

The table displaying section 220 displays a test flow table in which the test modules 10 included in the test procedure 20 are allocated to lines of the table. The table displaying section 220 may display, in addition to the test modules 10, the test methods 132 included in the test modules 10, and the condition files 122 combined with the test methods 132. Each of the test methods 132 and the condition files 122 are shown in the same line as the corresponding test module 10.

When a test-specifying column to specify any of the test modules 10 in the test flow table is operated, the test specifying section 230 displays a name of the test module 10 in the operated cell in the test flow table. Here, names of the test modules can be file names for the test module 10, or can be labels on the test modules 10. The test procedure generation apparatus 200 outputs the test flow table generated by the table displaying section 220 and the test specifying section 230 as the test procedure 20.

Figure 4:
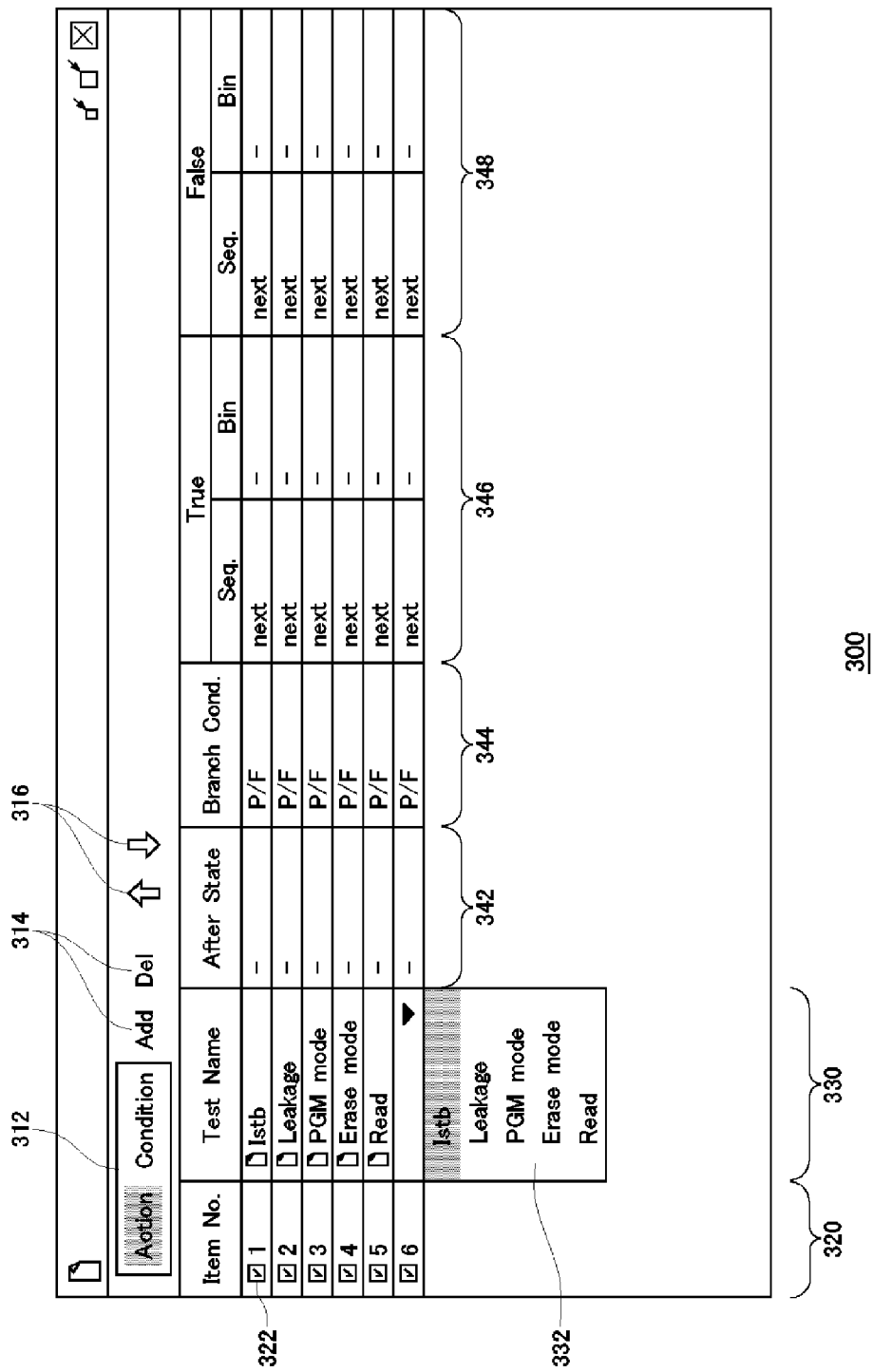
FIG. 4 shows a first configuration example of a test flow table 300 according to the embodiment.

FIG. 4 shows a first configuration example of a test flow table 300 according to the embodiment. The test flow table 300 arranges the test modules 10 in the order in which the test modules 10 are executed, and displays them in a tabular form.

The test flow table 300 may have an action display mode and a condition display mode. Referring to FIG. 4, the action display mode of the test flow table 300 will be now described. The test flow table 300 includes a display mode switching section 312, a line adding/deleting section 314, a row operating section 316, an execution designation column 320, a test module column 330, a after-process specifying column 342, a branch condition specifying column 344, a condition-satisfied branch-destination specifying column 346, and a condition-not-satisfied branch-destination specifying column 348.

The display switching section 312 switches the display mode of the test flow table 300. The display switching section 312 may have a button labeled as "Action" and a button labeled as "Condition." For example, the display mode switching section 312 switches the display mode to the action display mode when the "Action" button is pressed, and switches the display mode to the condition display mode when the "Condition" button is pressed. FIG. 4 illustrates the test flow table 300 in the action display mode.

The line adding/deleting section 314 adds or deletes one or more lines of the lines shown in the table. The line adding/deleting section 314 may have a button labeled as "Add" and a button labeled as "Del." For example, the line adding/deleting section 314 adds a single line when a user presses the "Add" button, and deletes one of the lines of the table when the user presses the "Del" button.

The line operating section 316 interchanges the line which a user selected with the next line above or below the selected line. The line operating section 316 may have a button with an up-arrow icon and a button with a down-arrow button icon. For example, when a user selected the third line and pressed the up-arrow button, the line operating section 316 interchanges the third line with the second line. Here, the user can select a line through a mouse, a trackball, a pen-tablet, cursor input, or the like.

The execution designation column 320 specifies whether the corresponding test module 10 is executed or not. The execution designation column 320 in a column showing the line number. The execution designation column 320 may assign a number "1" to the first line and assign the following numbers sequentially to the rest of the lines.

FIG. 4 illustrates an example in which the execution designation column 320 assigns a line number to the first line to the sixth line. The execution designation column 320 has a check box 322. When a user selects the check box 322, the test module 10 in the line corresponding to the selected check box is selected as the test module 10 to be executed.

The test module line 330 is a column that displays the test modules 10 that should be included in the test procedure 20 input by a user. The test module line 330 may have a dropdown list 332 that displays file names or names of the labels for the test modules 10 stored in the test module storing section 210. In this manner, the test specifying section 230 enables a user to select one of the test modules 10 and it can display the name of the test module 10 in the cell operated by the user in the test flow table 300.

Referring to FIG. 4, an example in which a user input the test module 10 in the sixth line is described. For example, when the user selects "Istb" from the dropdown list 332 showing the names of the test modules 10 including "Istb," "Leakage," "PGM mode," "Erase mode," and "Read," the test specifying section 230 displays "Istb" in the cell operated by the user in the test module column 330 that includes six lines.

The after-process specifying column 342 specifies whether power of a device under test is shut down or not after the test module 10 is executed. The after-process specifying column 342 is a column to specify a state after the test module 10 is executed in response to the user's input. The after-process specifying column 342 shows, for example, "-" when the voltage-current setting state is retained after the test module 10 is executed, and shows "PWR OFF" when the voltage-current setting state is shut down in the prescribed order after the test module 10 is executed. In the example shown in FIG. 4, a user inputs to specify that the voltage-current setting states should be retained for all the test modules 10 after the execution of the test.

The branch condition specifying column 344 specifies a branch condition. In other words, the branch condition specifying column 344 displays a branch condition after a test of the test module 10 is executed. For example, when a test flow is branched based on pass/fail of the test of the test module 10 in response to the user's input, the branch condition specifying column 344 displays "P/F" in the cell operated by the user. In the example shown in FIG. 4, a user inputs to choose that the test flow for all the test modules 10 is branched based on pass/fail of the tests.

The condition-satisfied branch-destination specifying column 346 specifies a branch destination when the branch condition specified by the branch condition specifying column 344 is satisfied. The condition-not-satisfied branch-destination specifying column 348 specifies a branch destination when the branch condition specified by the branch condition specifying column 344 is satisfied. The condition-satisfied branch-destination specifying column 346 and the condition-not-satisfied branch-destination specifying column 348 may select the next line as the branch destination in response to input by a user, or may specify the branch destination by the line number, the name of the test module 10, or the like. The condition-satisfied branch-destination specifying column 346 and the condition-not-satisfied branch-destination specifying column 348 may instruct discontinuation of the test flow.

For instance, the condition-satisfied branch-destination specifying column 346 and the condition-not-satisfied branch-destination specifying column 348 displays "next" in the cell operated by a user when the user performs input to indicate that the next line is selected as the branch destination. When a user inputs, as the branch destination, a line number, the name of the test module 10 or the like, the condition-satisfied branch-destination specifying column 346 and the condition-not-satisfied branch-destination specifying column 348 may display the line number or the name of the test module 10 in the cell to be operated.

The condition-satisfied branch-destination specifying column 346 and the condition-not-satisfied branch-destination specifying column 348 may display "stop" in the cell operated by a user when the user performs input to discontinue the test flow. In the example shown in FIG. 4, a user selects the next line as the branch destination for all the test modules 10 regardless the branch condition in the branch condition specifying column 344 is satisfied or not. In this example, the test flow table 300 shows a test flow in which tests of the test module 10 shown in the first line to the test module 10 shown in the sixth line are sequentially performed.

Figure 5:
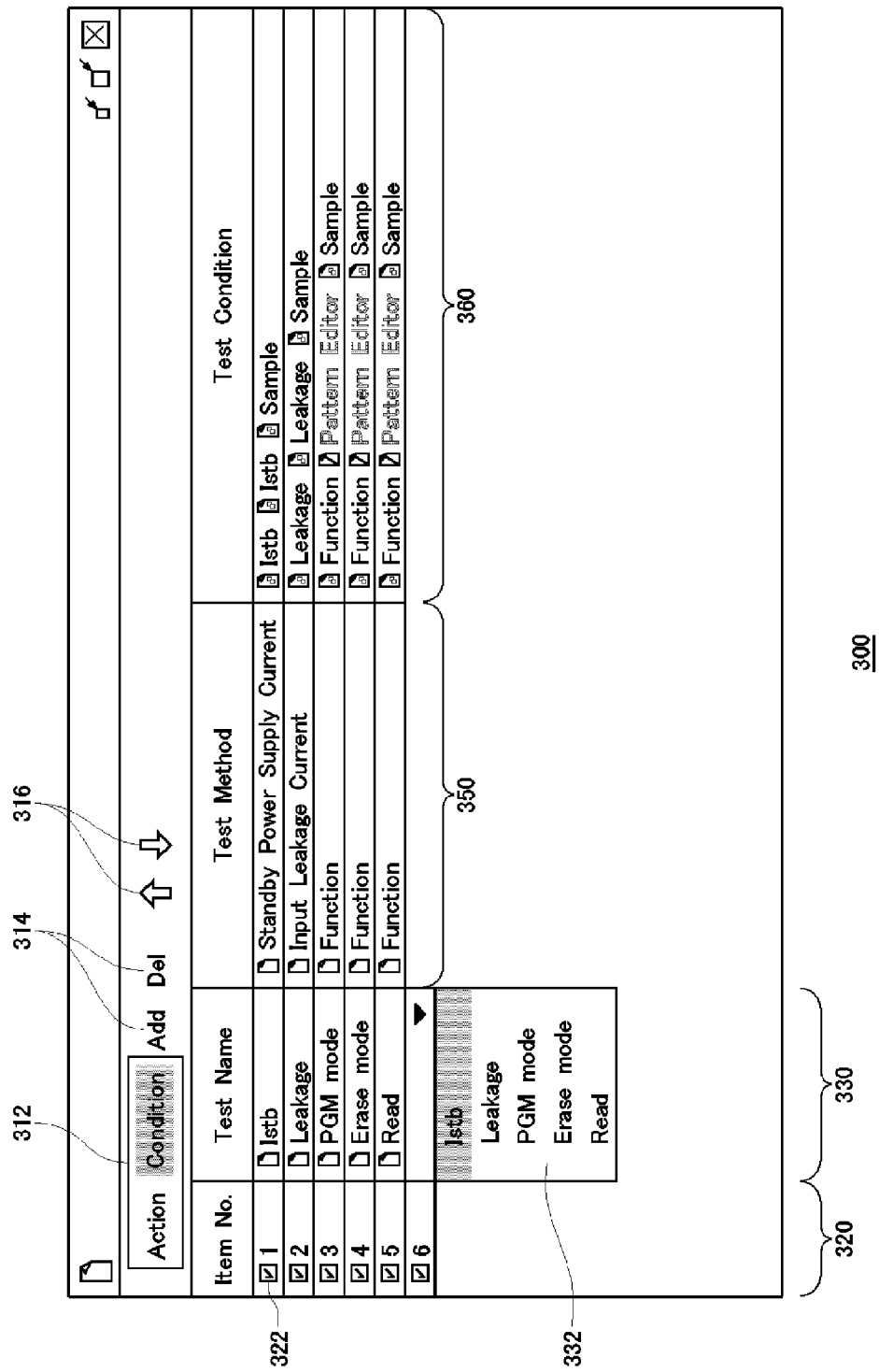
FIG. 5 shows a second configuration example of the test flow table 300 according to the embodiment.

FIG. 5 shows a second configuration example of the test flow table 300 according to the embodiment. Referring to FIG. 5, the condition display mode of the test flow table 300 will be now described. In the flow table 300 shown in FIG. 5, the identical reference numerals are given to the elements having substantially the same actions as those in the test flow table 300 illustrated in FIG. 4, and description for these elements will be hereunder omitted. The test flow table 300 includes a test method column 350 and a test condition column 360.

The test method column 350 shows the test method 132 which the test module 10 uses. Cells in the test method column 350 each shows the test method 132 which the test module 10 uses. For instance, "Read" test module 10 that is executed as the 5th test executes the test method 132 named "Function."

Here, the table displaying section 220 may display an editing screen on which the test method 132 can be edited, when a user clicks the test method 132 in each line of the test flow table 300. In this way, the user is able to edit the test method 132 while confirming the test flow of the tests to be executed.

The test condition column 360 shows the condition files 122 which specify test conditions used for tests. In each cell of the test condition column 360, at least one condition file 122 that corresponds to the test method 132 shown in the same line may be listed. For example, the test method "Function" 132 with which the third test module "PGM mode" 10 is executed performs the test with test conditions written in the condition files 122 labeled as "Function," "Pattern Editor," and "Sample."

When a user clicks the condition file 122 in each line of the test flow table 300, the table displaying section 220 displays an editing screen on which the condition file 122 can be edited. Here, the table displaying section 220 may signals the test module generation apparatus 100 to cause the editing section 112 corresponding to the condition file 122 in the condition file generating section 110 to edit the condition file 122. In this manner, a user is able to edit the condition file 122 while confirming the test flow of the tests to be executed.

According to the test procedure generation apparatus 200 of the embodiment described above, in response to user's input, it is possible to generate a test procedure to specify the test modules 10 to be executed, an order in which the test modules 10 are executed, a power supply state of a device under test after the tests of the test modules 10 are executed, and a branch process depending on pass/fail of the tests. Moreover, the test procedure generation apparatus 200 can generate the test procedure of the tests to be executed without user's knowledge about the hardware specification and the programming language of the test apparatus.

Figure 6:
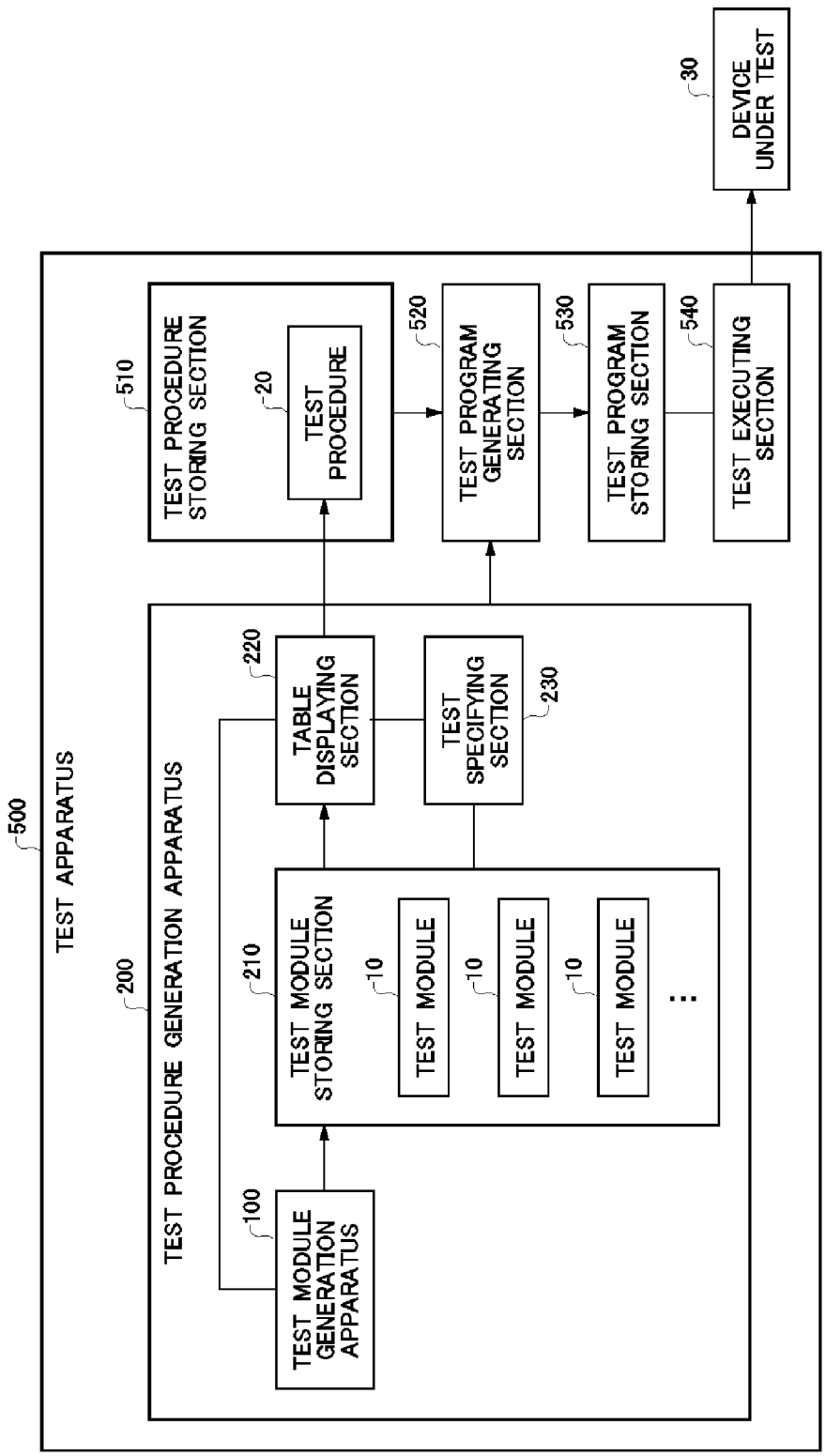
FIG. 6 shows a configuration example of a test apparatus 500 according to an embodiment together with a device under test 30.

FIG. 6 shows a configuration example of a test apparatus 500 according to an embodiment together with a device under test 30. For the test apparatus 500 in this embodiment, the identical reference numerals will be given to the same elements having the same actions as those as the test procedure generation apparatus 200 shown in FIG. 3, and those description will be hereunder omitted. The test apparatus 500 test the device under test 30. The test apparatus 500 includes the test procedure generation apparatus 200 which has been described above with reference to FIGS. 3 to 5, a test procedure storing section 510, a test program generating section 520, a test program storing section 530, and a test executing section 540.

The test procedure storing section 510 stores the test procedure 20 generated by the test procedure generation apparatus 200. The test procedure storing section 510 stores a plurality of the test procedures 20 which are generated in advance. The test procedure storing section 510 may be a memory device that stores data, or may be an external storage device or the like.

The test program generating section 520 generates a test program based on the test procedure 20 generated by the test procedure generation apparatus 200. The test program test generating section 520 may generate a test program in an executable format. Because the test procedure 20 has information about the test method 132 in which algorism for the hardware modules are described, the condition file 122 in which the test conditions used by the test method 132, the test flow of the test module 10, and information about the branch process, the test program 520 is able to automatically generate the test program according to the above-mentioned pieces of information.

The test program storing section 530 stores the test program generated by the test program generating section 520. The test program storing section 530 may store a plurality of the test programs which are generated in advance. The test program storing section 530 may be a memory device that stores data, or may be an external storage device or the like.

The test executing section 540 executes the test programs stored in the test program storing section 530 to test the device under test 30. The test executing section 540 can test at least one device under test 30 such as an analog circuit, a digital circuit, an analog/digital consolidated circuit, a memory, a system on chip (SOC) and the like. The test executing section 540 inputs, to the device under test 30, a test signal according to a test program to test the device under test 30, and judges pass or fail of the device under test 30 based on an output signal which is output by the device under test 30 in response to the test signal.

The test executing section 540 may directly receive the test procedure 20 stored in the test procedure storing section 510 and execute tests according to the test procedure 20. In other words, the test executing section 540 performs testing of the device under test 30 by sequentially executing the test modules 10 included in the test procedure 20. For example, the test executing section 540 executes the test procedure 20 in response to the test procedure 20 input by a user in the test flow table 300.

The test executing section 540 may directly receive the test modules 10 stored in the test module storing section 210 to conduct a test according the test modules 10. For instance, the test executing section 540 executes the test module 10 when a user inputs execution of the test module 10 through the operation of the test flow table 300 or the operation to generate the test module 10 in the test module generation apparatus 100.

In the above-described manner, the test executing section 540 can execute the test module 10 which a user generates through the test module generation apparatus 100 or execute the test procedure 20 which a user generates through the test procedure generation apparatus 200.

In the above embodiment, the test executing section 540 is provided together with the test procedure generation apparatus 200 in the test apparatus 500. Alternatively, the test executing section 540 may be a test apparatus provided external to the test procedure generation apparatus 200. In this case, the test program generation apparatus includes the test procedure generation apparatus 200, the test procedure storing section 510, the test program generating section 520, and the test program storing section 530. The test program generation apparatus and the test apparatus are electrically connected to each other. Here, the test program generation apparatus and the test apparatus may be connected through a network by a wire communication and/or wireless communication.

In this way, the test program generation apparatus can be configured with computers such as personal computers and work stations, and a test program can be generated in any place different from the test apparatus. Moreover, the test program can be generated in computers so that an application debugging the test program can be implemented in the computers, and consequently it is possible to generate the test program efficiently. Furthermore, the computers can execute an application that evaluates and analyzes test results. In this case, a user can evaluate and analyze the test result while the test apparatus is executing tests.

Figure 7:
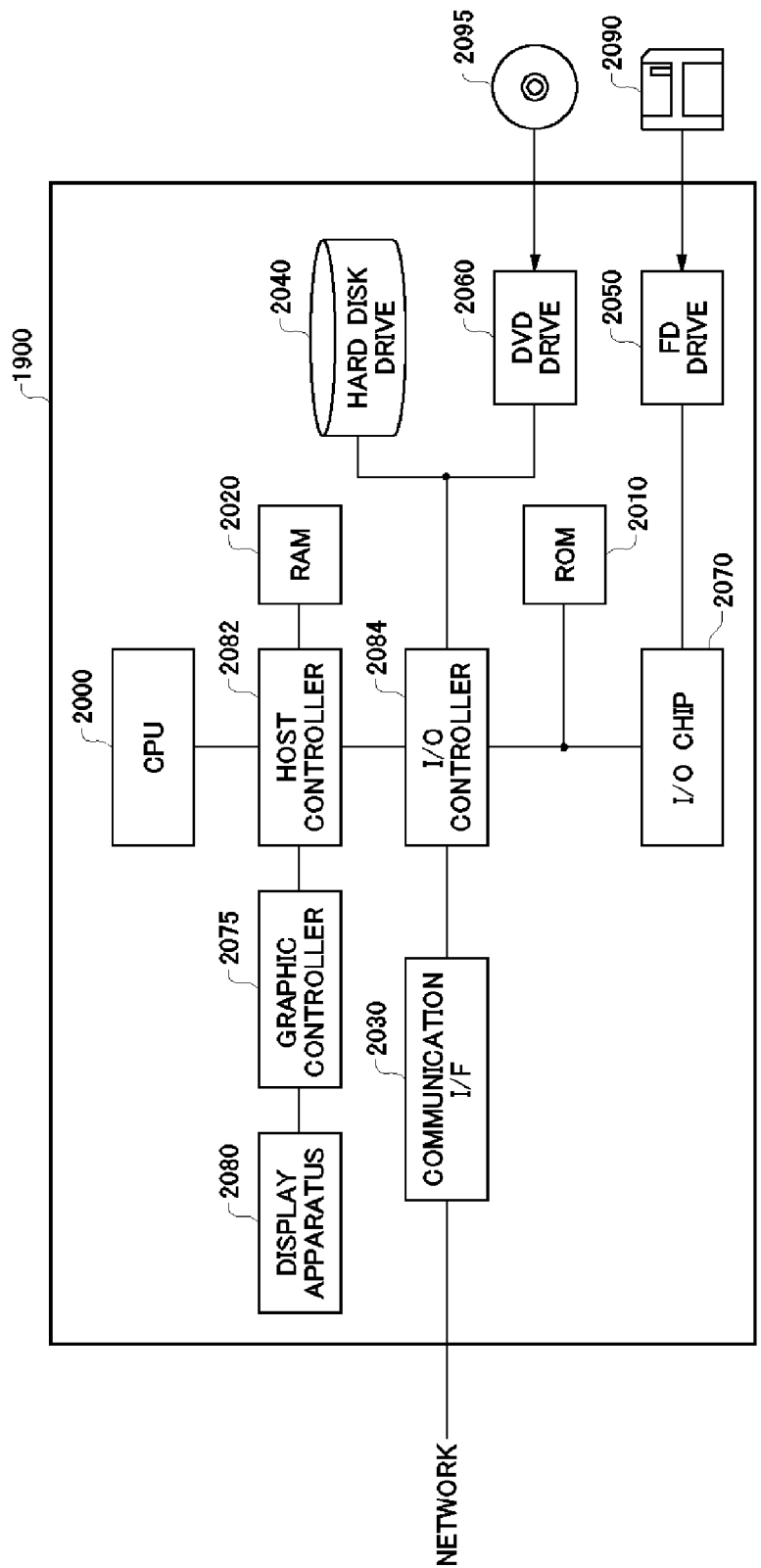
FIG. 7 illustrates a hardware configuration of a computer 1900.

FIG. 7 illustrates a hardware configuration of a computer 1900. The computer 1900 according to the embodiment is equipped with a CPU periphery that includes a CPU 2000, a RAM 2020, a graphics controller 2075, and a display apparatus 2080 which are interconnected by a host controller 2082. The computer 1900 is further equipped with an input/output unit having a communication interface 2030, a hard disk drive 2040, and a DVD drive 2060 which are connected to the host controller 2082 via an input/output controller 2084, and a legacy input/output unit having a ROM 2010, a flexible disk drive 2050, and an input/output chip 2070 which are connected to the input/output controller 2084.

The host controller 2082 connects the RAM 2020 to the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 or the like on a frame buffer provided in the RAM 2020, and causes the image data to be displayed on the display apparatus 2080. Alternatively, the graphics controller 2075 may contain therein a frame buffer for storing image data generated by the CPU 2000 or the like.

The input/output controller 2084 connects the host controller 2082 with the communication interface 2030, the hard disk drive 2040, and the DVD drive 2060, which are relatively high-speed input/output apparatuses. The communication interface 2030 communicates with other apparatuses via a network. The hard disk drive 2040 stores a program and data used by the CPU 2000 within the computer 1900. The DVD drive 2060 reads the program or the data from the DVD-ROM 2095, and provides the hard disk drive 2040 with the program or the data via the RAM 2020.

The ROM 2010, and the flexible disk drive 2050 and the input/output chip 2070 which are relatively low-speed input/output apparatuses are connected to the input/output controller 2084. The ROM 2010 stores therein a boot program executed by the computer 1900 at the time of activation, a program depending on the hardware of the computer 1900, or the like. The flexible disk drive 2050 reads the programs or data from a flexible disk 2090, and provides the hard disk drive 2040 with the programs or data via the RAM 2020. The input/output chip 2070 connects a flexible disk drive 2050 to an input/output controller 2084, and connects various input/output apparatuses via a parallel port, a serial port, a keyboard port, a mouse port, and the like to the input/output controller 2084.

A program to be provided for the hard disk drive 2040 via the RAM 2020 is provided by a user by being stored in such a recording medium as the flexible disk 2090, the DVD-ROM 2095, and an IC card. The program is read from the recording medium, installed into the hard disk drive 2040 within the computer 1900 via the RAM 2020, and executed in the CPU 2000.

The program is installed in the computer 1900, and it causes the computer 1900 to serve as the test module generation apparatus 100, the test procedure generation apparatus 200, or the test program generation apparatus.

When Information processing described in a program is read in the computer 1900, it works as the test module generation 100, the test procedure generation apparatus 200, or the test program generation apparatus, which are embodied means in which software and the above-mentioned various hardware resources operate cooperatively. By realizing operations or processing of information adapted to intended use of the computer 1900 according to the embodiment, it is possible to configure the condition file generating section 110, the condition file storing section 120, the test method storing section 130, the test method selecting section 140, the condition file selecting section 150, the test module generating section 160, the test module storing section 210, the table display section 220, the test specifying section 230 and the like.

For example, when communication is performed between the computer 1900 and an external apparatus and the like, the CPU 2000 executes a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording apparatus such as a RAM 2020, a hard disk drive 2040, a flexible disk 2090, or a DVD-ROM 2095, and transmits the read transmission data to a network, or writes reception data received from a network to a reception buffering region or the like provided on the recording apparatus. In this way, the communication interface 2030 may exchange transmission/reception data with the recording apparatus by a DMA (direct memory access) method, or by a configuration that the CPU 2000 reads the data from the recording apparatus or the communication interface 2030 of a transfer destination, to write the data into the communication interface 2030 or the recording apparatus of the transfer destination, so as to transfer the transmission/reception data.

In addition, the CPU 2000 causes all or a necessary portion of the file of the database to be read into the RAM 2020 such as by DMA transfer, the file or the database having been stored in an external recording apparatus such as the hard disk drive 2040, the DVD drive 2060 (DVD-ROM 2095), the flexible disk drive 2050 (flexible disk 2090), to perform various types of processing onto the data on the RAM 2020. The CPU 2000 then writes back the processed data to the external recording apparatus by means of a DMA transfer method or the like. In such processing, the RAM 2020 can be considered to temporary store the contents of the external recording apparatus, and so the RAM 2020, the external recording apparatus, and the like are collectively referred to as a memory, a storage section, or a recording apparatus, and so on in the present embodiment. In the embodiment, various types of information such as various types of programs, data, tables, and databases are stored in the recording apparatus, to undergo information processing. Note that the CPU 2000 may also retain a part of the RAM 2020 in a cache memory, to perform reading/writing thereto on the cache memory. In such an embodiment, too, the cache memory is considered to be contained in the RAM 2020, the memory, and/or the recording apparatus unless noted otherwise, since the cache memory performs part of the function of the RAM 2020.

The CPU 2000 performs various types of processing, onto the data read from the RAM 2020, which includes various types of operations, processing of information, condition judging, search/replace of information, described in the present embodiment and designated by an instruction sequence of programs, and writes the result back to the RAM 2020. For example, when performing condition judging, the CPU 2000 judges whether each type of variables shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 can search for information in the file or database or the like in the recording apparatus. For example when a plurality of entries, each having an attribute value of a first attribute is associated with an attribute value of a second attribute, are stored in a recording apparatus, the CPU 2000 searches for an entry matching the condition whose attribute value of the first attribute is designated, from among the plurality of entries stored in the recording apparatus, and reads the attribute value of the second attribute stored in the entry, thereby obtaining the attribute value of the second attribute associated with the first attribute satisfying the predetermined condition.

The above-explained program or module can be stored in an external recording medium. Exemplary recording medium include a flexible disk 2090, a DVD-ROM 2095, as well as an optical recording medium such as a DVD or a CD, a magneto-optic recording medium such as a MO, a tape medium, and a semiconductor memory such as an IC card. In addition, a recording apparatus such as a hard disk or a RAM provided in a server system connected to a dedicated communication network or the Internet can be used as a recording medium, thereby providing the program to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A test procedure generation apparatus that generates a procedure for testing a device under test, comprising:
   hardware memory;
   a test module generation apparatus that generates a procedure for testing the device under test;
   a test module storing section that stores the test module generated by the test module generation apparatus;
   a table displaying section that displays a test flow table in which the test module included in the test procedure is allocated to a line of the test flow table; and
   a test specifying section that, in response to an operation on a test-specifying column to designate the test module in the test flow table, shows a name of the test module in an operated cell in the test flow table, wherein
   the test specifying section enables a user to select one of a plurality of the test modules and shows a name of the test module in an operated cell in the test flow table, and
   the test module generation apparatus comprises:
   a condition file generating section in which a test condition is input and that generates a condition file defining the input test condition;
   a test method storing section that stores a test method;
   a test method selecting section that receives, from a user, a selection instruction of the test method adapted to the test module to be generated;
   a condition file selecting section that receives, from a user, a selection instruction of the condition file corresponding to a parameter which the selected test method requires; and
   a test module generating section that generates the test module in which a test according to the selected test method is executed with a parameter specified by the condition file.

2. The test procedure generation apparatus according to claim 1, wherein
   when parameter input is specified in the test method selected by a user, the user inputs a parameter in the test module generating section.

3. The test procedure generation apparatus according to claim 2, wherein
   when a specifics button on an input screen for inputting the parameter is pressed, the test module generating section displays a setting screen for setting other parameters for corresponding hardware modules.

4. The test procedure generation apparatus according to claim 1, wherein
   when file input is specified in the test method selected by a user, the user specifies the condition file.

5. The test procedure generation apparatus according to claim 1, wherein
   the test method specifies an order in which basic test programs are invoked.

6. The test procedure generation apparatus according to claim 5, wherein the test method includes:
   a definition section describing a definition of a test condition;
   a conversion section that describes association between a test condition defined by the definition section and a hardware module in which the test condition is set; and
   an execution processing section that describes a sequence of tests according to the test method.

7. The test procedure generation apparatus according to claim 1, wherein
   the test flow table includes a condition-satisfied branch-destination specifying column that specifies a branch destination when a branch condition is satisfied, and a condition-not-satisfied branch-destination specifying column that specifies a branch destination when the branch condition is not satisfied.

8. The test procedure generation apparatus according to claim 7, wherein
   the test flow table further includes a branch condition specifying column that specifies the branch condition.

9. The test procedure generation apparatus according to claim 1, wherein the test flow table further includes an execution designation column that specifies whether a corresponding test module is executed or not.

10. The test procedure generation apparatus according to claim 1, wherein
    the test flow table includes an after-process specifying column that specifies whether power of a device under test is shut down or not after the test module is executed.

11. The test procedure generation apparatus according to claim 1, wherein
    the test flow table includes a test condition column that shows the condition file that specifies a test condition used for a test.

12. The test procedure generation apparatus according to claim 11, wherein
    at least one condition file is listed in each cell of the test condition column.

13. The test procedure generation apparatus according to claim 12, wherein
    the table displaying section displays an editing screen on which the condition file can be edited when the condition file in each line of the test flow table is clicked.

14. A method of testing a device under test, comprising:
    generating a condition file that defines an input test condition;
    storing a test method;
    receiving, from a user, a selection instruction of the test method adapted to a test module to be generated;
    receiving, from a user, a selection instruction of the condition file corresponding to a parameter which the selected test method requires;
    generating the test module in which a test according to the selected test method is executed with a parameter specified by the condition file;
    storing the test module in a test procedure generation apparatus that generates a procedure for testing the device under test;
    displaying a test flow table in which the test module included in the test procedure is allocated to a line of the test flow table;
    showing, in response to an operation on a test-specifying column to designate the test module in the test flow table, a name of the test module in an operated cell in the test flow table;
    storing the test procedure generated by the test procedure generation apparatus; and
    sequentially executing test modules included in the test procedure.

15. A non-transitory computer readable medium on which are recorded computer instructions that, when executed by a computer, enable the computer to perform the method according to claim 14.

16. A test apparatus that tests a device under test, comprising:
    hardware memory;
    a test procedure generation apparatus that generates a procedure for testing the device under test;

a test procedure storing section that stores a test procedure generated by the test procedure generation apparatus; and a test executing section that sequentially executes test modules included in the test procedure, wherein the test procedure generation apparatus comprises:

a test module generation apparatus that generates a test module executed on the test apparatus;

a test module storing section that stores the test module generated by the test module generation apparatus;

a table displaying section that displays a test flow table in which the test module included in the test procedure is allocated to a line of the test flow table; and a test specifying section that, in response to an operation on a test-specifying column to designate the test module in the test flow table, shows a name of the test module in an operated cell in the test flow table, and the test module generation apparatus comprises:

a condition file generating section in which a test condition is input and that generates a condition file defining the input test condition;

a test method storing section that stores a test method;

a test method selecting section that receives, from a user, a selection instruction of the test method adapted to the test module to be generated;

a condition file selecting section that receives, from a user, a selection instruction of the condition file corresponding to a parameter which the selected test method requires; and a test module generating section that generates the test module in which a test according to the selected test method is executed with a parameter specified by the condition file.

* * * * *